United States Patent
Akbar et al.

(10) Patent No.: US 12,335,218 B2
(45) Date of Patent: Jun. 17, 2025

(54) MACHINE-LEARNING NOTIFICATION SERVICE

(71) Applicant: DISCORD INC., San Francisco, CA (US)

(72) Inventors: Imran Akbar, Allen, TX (US); Gaurav Chakravorty, Fremont, CA (US); Ravi Mandliya, Issaquah, WA (US); Risa Pesavento, Sunnyvale, CA (US)

(73) Assignee: DISCORD INC., San Francisco, CA (US)

( * ) Notice: Subject to any disclaimer, the term of this patent is extended or adjusted under 35 U.S.C. 154(b) by 458 days.

(21) Appl. No.: 17/935,432

(22) Filed: Sep. 26, 2022

(65) Prior Publication Data

US 2024/0056410 A1 Feb. 15, 2024

Related U.S. Application Data

(60) Provisional application No. 63/397,705, filed on Aug. 12, 2022, provisional application No. 63/408,023, filed on Sep. 19, 2022.

(51) Int. Cl.
*H04L 51/224* (2022.01)
*G06F 9/54* (2006.01)
*G06Q 50/00* (2012.01)

(52) U.S. Cl.
CPC ............ *H04L 51/224* (2022.05); *G06F 9/542* (2013.01); *G06Q 50/01* (2013.01)

(58) Field of Classification Search
CPC ........ H04L 51/224; G06F 9/542; G06Q 50/01
See application file for complete search history.

(56) References Cited

U.S. PATENT DOCUMENTS

2021/0126885 A1* 4/2021 Zhang .................. H04L 51/226

* cited by examiner

*Primary Examiner* — Curtis B Odom
(74) *Attorney, Agent, or Firm* — Polsinelli PC

(57) ABSTRACT

The present technology provides a smart notification service that is machine-learning driven and integrates with smart channels for determining how the user is receiving notifications and smart notification generators for determining what notifications should be sent and to whom, based on what notifications have been sent previously to the users and how they interacted with the previously sent notifications. The machine-learning model is trained by previously sent notifications to optimize the kind of notifications being sent, who receives the notifications, and in what cadence they receive such notifications.

20 Claims, 8 Drawing Sheets

MACHINE-LEARNING NOTIFICATION SERVICE

CROSS-REFERENCE TO RELATED APPLICATION

This application claims priority to U.S. Provisional Application No. 63/397,705 filed Aug. 12, 2022, and U.S. Provisional Application No. 63/408,023 filed Sep. 19, 2022, which are incorporated by reference herein in its entirety.

FIELD

The present technology generally relates to a method for a notification service, and in particular, using machine learning to optimize the notification service.

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. Within each online community, there may be many channels in which messages are being sent throughout the day. Accordingly, getting notifications for all of the messages can be overwhelming.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
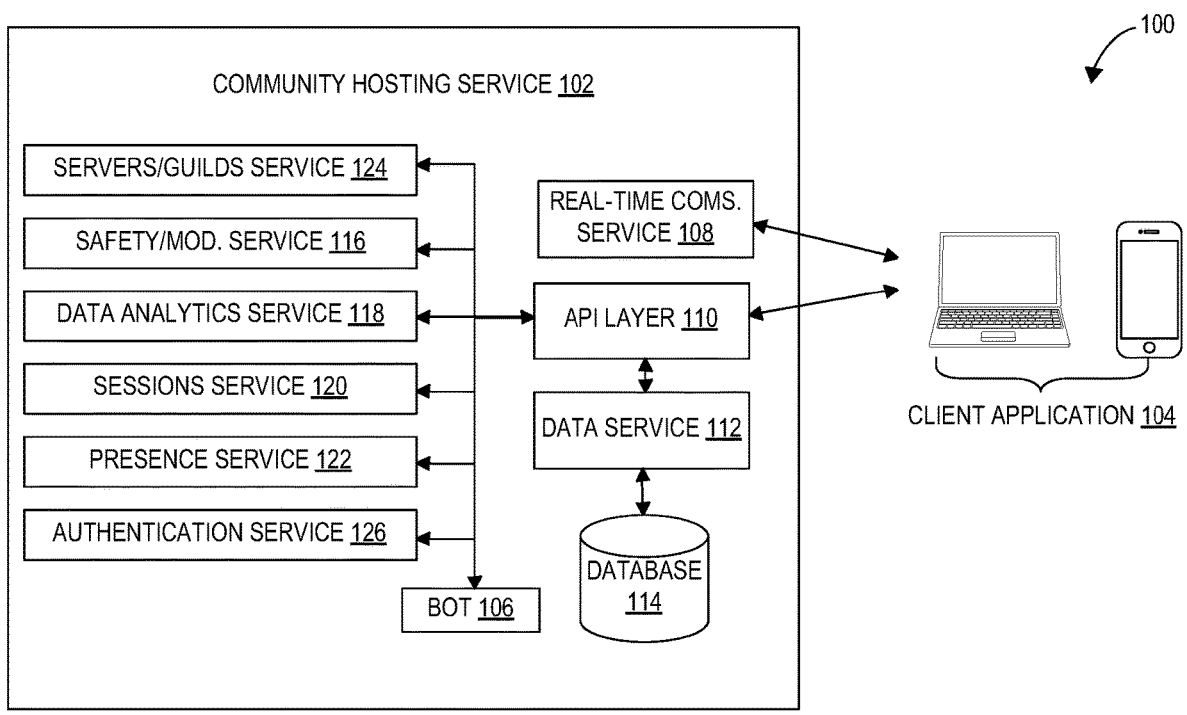
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for improved notification experiences using machine-learning. Notifications, when sent at the right time and in the right manner, can help users stay connected to their communities and friends. However, when there are hundreds or thousands of messages that are being sent throughout the day in various communication channels that users are members of, it can be tedious or near impossible to sort through the notifications. In some cases, for larger communities, notifications may end up being disabled for most notifications other than specific instances, such as mentions (using @username to call out specific users). In such cases, the issue associated with communications for larger communities is that such channels effectively become limited to serving synchronous communications. In other words, if most people do not utilize the channels to review what conversations had occurred while they were away because it would be too tedious, such channels may lose user engagement and the channels are not optimized for their purpose.

There are a couple of specific problems that can be solved using machine-learning for notification services. There is a temporal issue that needs to be addressed, meaning that certain urgent messages need to be pushed to users in real-time while less urgent messages can be delayed, such as being consolidated into a summary notification sent at a later time. There is also a volume issue that needs to be addressed. If each message posted in the communication channels is sent to each member, such a high volume may end up being counterproductive, and merely delaying to send a consolidate summary notification may not be agile enough either.

As such, there is a need to not only provide smart channels for determining how the user is receiving notifications but also smart notification generators for determining what notifications should be sent and to whom, based on what notifications have been sent previously to the users and how they interacted with the previously sent notifications. In other words, there is a need for a smart notification service with a machine-learning model that is trained by previously sent notifications to optimize the kind of notifications being sent, who receives the notifications, and in what cadence they receive such notifications. Furthermore, providing these smart inputs and smart channels help drive user engagement and increase user retention as well.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing.

Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot configuration service 126 for creating and/or configuring one or more bots 106. The bot configuration service 126 can provide tools and template configurations to configure bots to take on a variety or roles within a channel of a server. The bots 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bot 106 can have their own user account and are authenticated using a token. bot 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
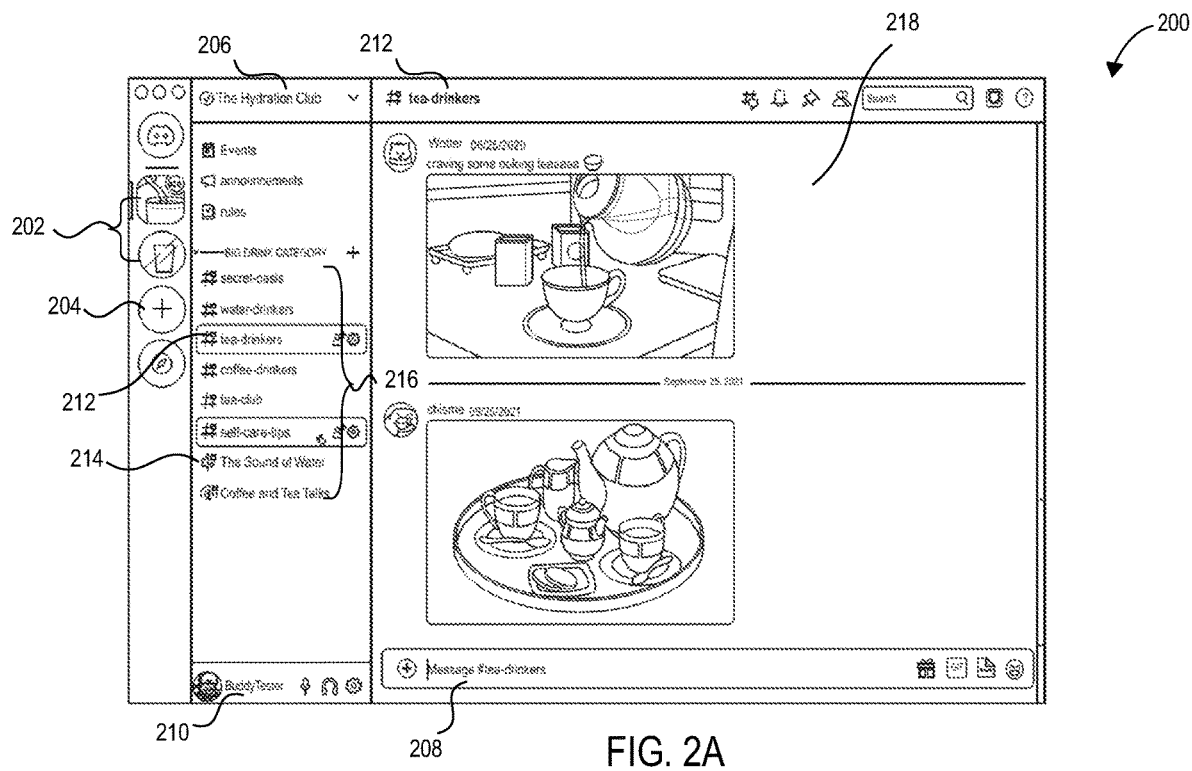
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 218 that are part of the server hydration club server. One of the channels, entitled "tea drinkers" 212 is a non-real-time messaging channel. The message thread within the "tea drinkers" 214 channel can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
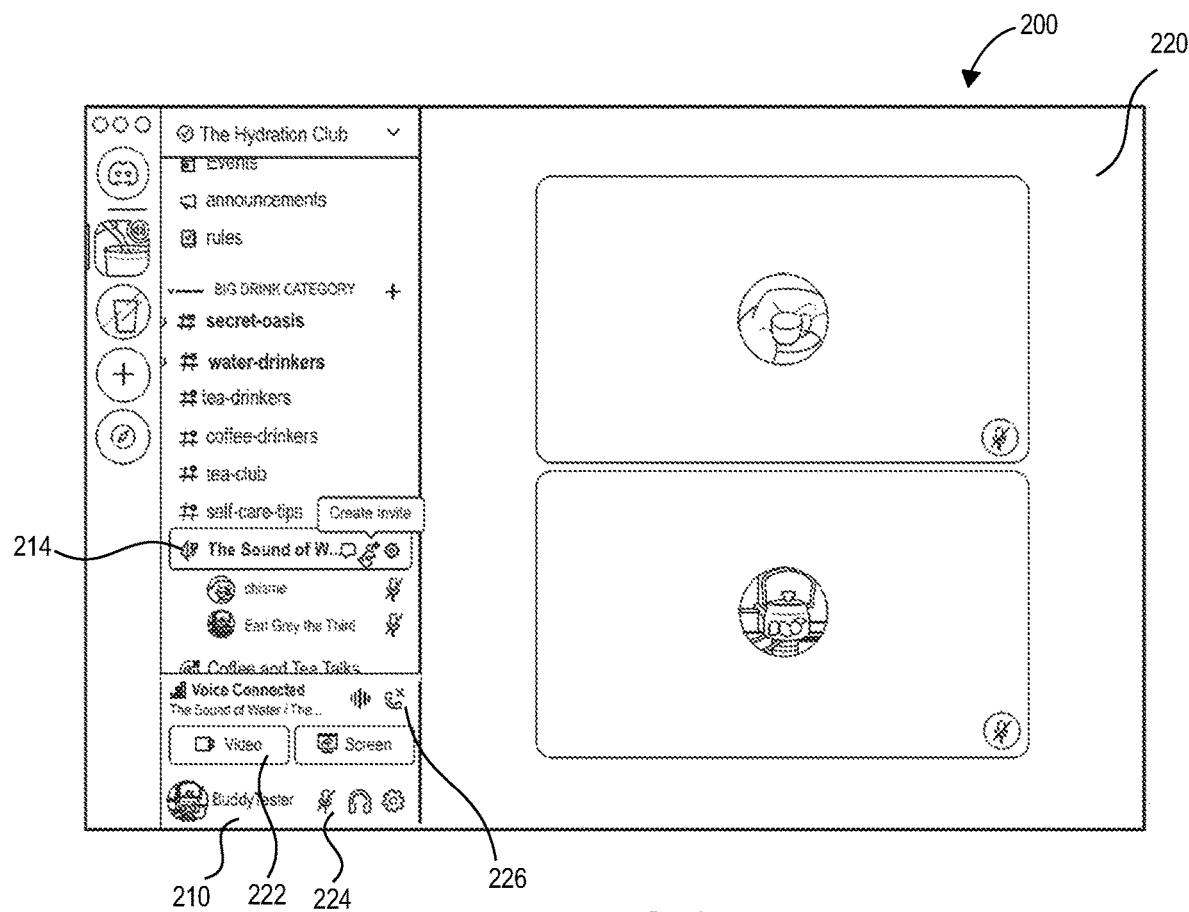
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
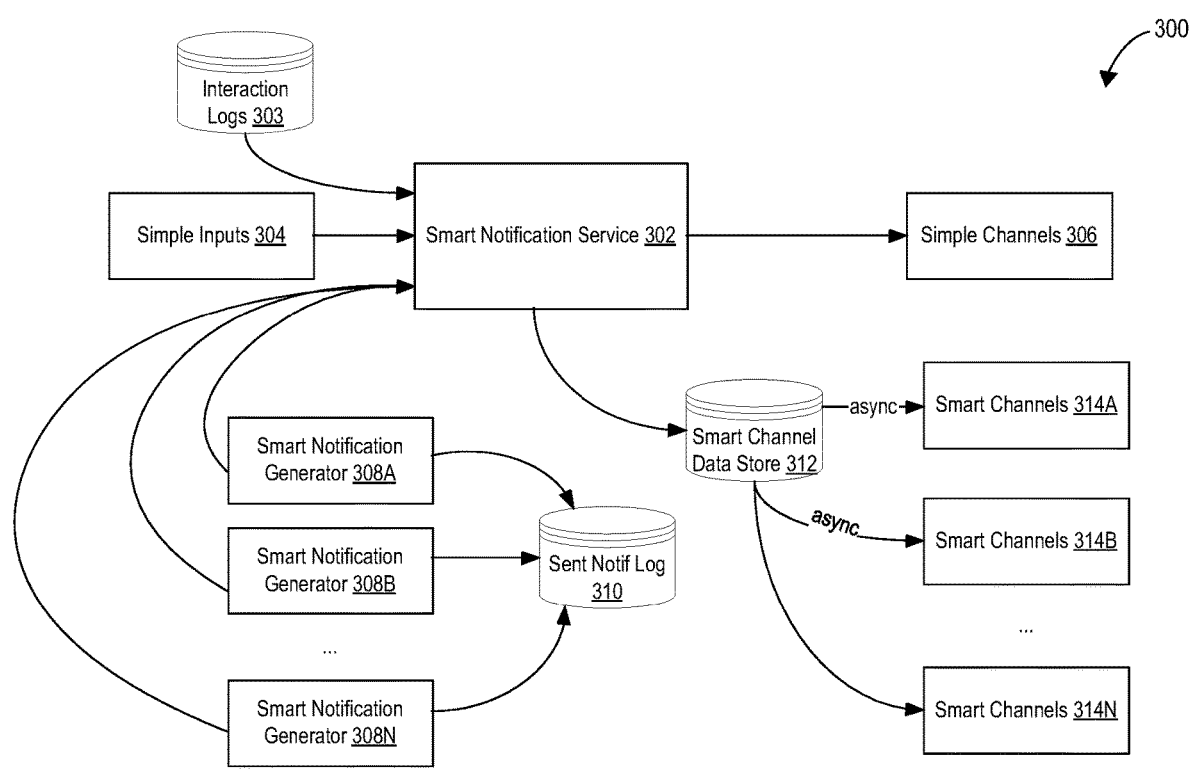
FIG. 3 illustrates an example flowchart diagram for a smart notification service, according to some examples of the present disclosure.

FIG. 3 illustrates an example flowchart diagram 300 for a smart notification service, according to some examples of the present disclosure.

The smart notification service 302 that is machine-learning driven may receive various notification inputs that are simple inputs 304. Simple inputs 304 may include a message that "a creator went live" or a direct message, which are organic notifications that users expect to receive immediately. These types of notifications are generally sent to the respective users via simple channels 306 to be delivered to the respective client. It is useful to send such simple inputs 304 via the smart notification service 302 because the service has the option to not send the message if it believes the user is unlikely to interact with it.

The smart notification service 302 may integrate with various different kinds of smart notification generators 308A, 308B ... 308N (together, 308) as well as various smart channels 314A, 314B ... 314N (together, 314). In deciding what notifications to generate, smart notification generators 308 consider sent notifications from a sent notification log 310. For example, a top notification service that will be discussed in more detail below is a type of smart notification generator that generates optimal notifications to send to optimal users at an optimal time for the respective users. Other types of smart notification generators 308 may include, for example, a smart email digest that summarizes and filters out information that may have been sent and/or already read by the respective user. As for smart channels, some example smart channels may be asynchronous and batch certain notifications for delayed delivery. The smart channels may determine when a batched delayed delivery is most suitable for various user based on learned interactions from the interactions logs 303 that trained the machine-learning model of the smart notification service 302.

The smart channels 314 may receive asynchronous data from a smart channel data store 312 for delayed notifications. In addition, smart channels 314 may send notifications to various notification surfaces where notifications can appear. For example, some notification surfaces may include push notifications, a notification inbox, in-application notifications, or an email inbox. The smart channels 314 may determine, for example, that which notification surface to send a particular notification and when.

Figure 4:
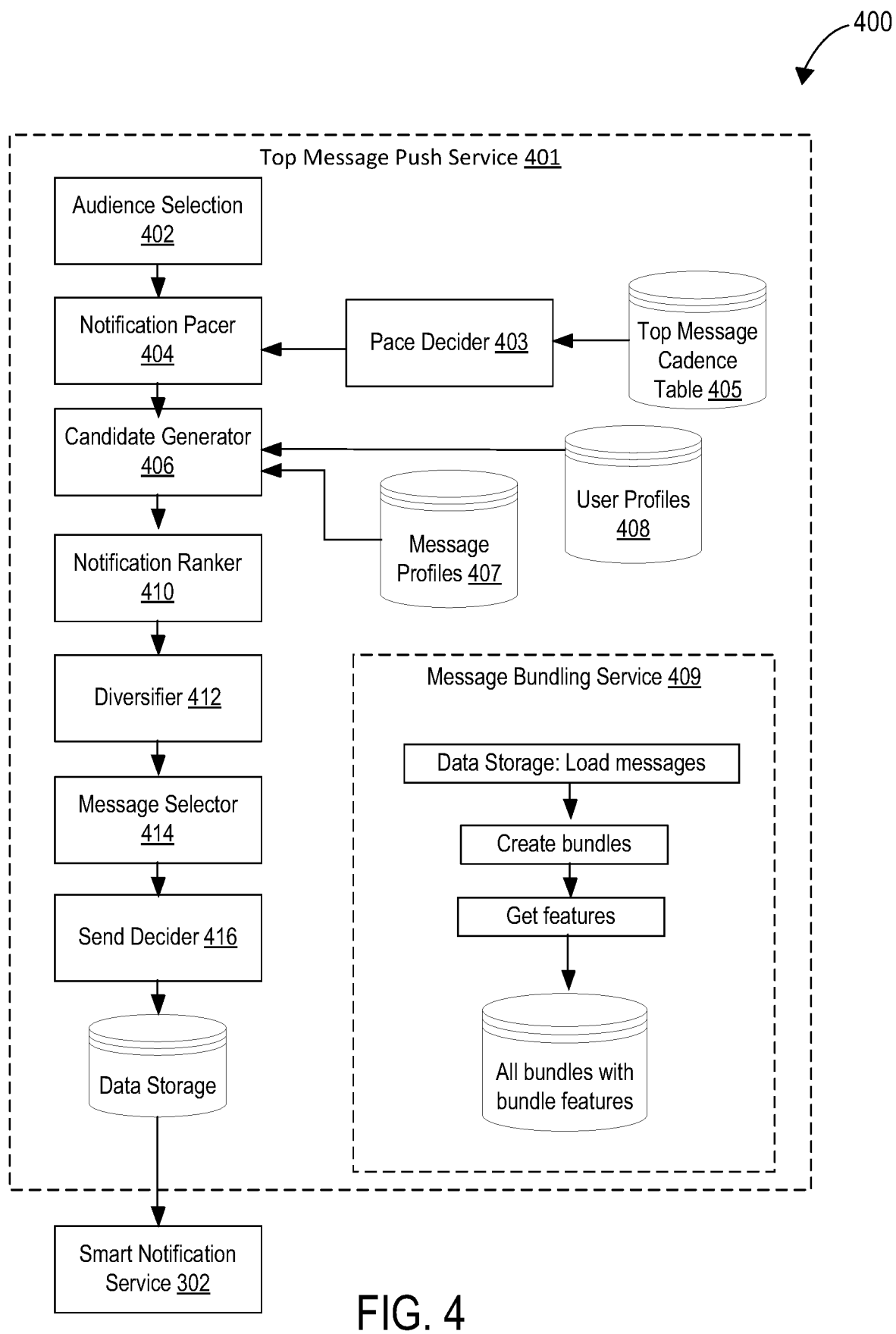
FIG. 4 illustrates an example flowchart diagram for a top message service for the smart notification service in accordance with one embodiment.

FIG. 4 illustrates an example flowchart diagram for a top message push service for the smart notification service in accordance with one embodiment.

The top message push service 401 may be a type of smart notification generator 308 that focuses on determining an optimal notification for an optimal audience within a time period that the user will most likely find such a notification to be useful. The audience may first be filtered using an audience selection service 402 that determines a set of eligible users based on when a last inorganic notification was sent to the user. There could be other criteria as well, such as the user's demographic information, their communication preferences, engagement with that type of content, etc. An inorganic notification may include any notification that a user may not typically expect, such as highlighted messages from respective channels, promotions and email campaigns, etc., as opposed organic notifications, which include direct messages. The selected set of eligible users will not have recently receives an inorganic notification as a push notification for an established period of time. The audience selection service 402 may run every incremental period of time.

A pace decider service 403 may determine a cadence, in which notifications are sent (i.e., once per day, once per 3 days, etc.), associated with each user based on features such as notification engagement and store the cadence in association with the users in a top message cadence table 405. A notification pacer service 404 may receive information about eligible users from the audience selection service 402, user cadence from the pacer decider service 403, and last sent notification data from the sent notification log 310 and generate a set of eligible users with associated cadences.

A candidate generator service 406 may receive the set of eligible users and receive a set of trending content associated with the channels that the set of eligible users are members of and best times to send to each of the eligible users. The candidate generator service 406 may pull a set of message candidates for a subset of the eligible users for whom it is optimal to send a push notification at this time. In addition, there may be a safety and filtering service that follows any hard constraints of the community hosting service 102, such as based on access control or user preference settings (such as channel gated or muted), as well as like filtering messages to assist with item deduplication.

A notification ranker service 410 may receive the subset of eligible users and their associated message candidates. The notification ranker service 410 may further receive read message features from a message profile database 407 and read user features from user profiles 408 to determine a ranking of the subset of eligible users and their associated message candidates. Read message feature sand read user features are additional user metadata, such as their location, interests, frequency of usage, etc. For example, certain message features may indicate that the message would be relevant to the potential recipient based on their content, such as whether the message is fresh, whether the message is a question, whether the user had interactive with posts about a similar topic (e.g., using text embeddings), or whether the message is popular, would increase the score of the associated message. Other features that may increase the score of the message may be associated with the user, such as whether the potential recipient follows or is friends with the author of the message. In addition, probability predictions for whether the user may engage with an item or a multiple time type may be determined to increase the score for certain message candidates. There also may be multiple scoring machine-learning models that are trained separate and combined into serve as a calibrated model that scores the subset of eligible users for ranking.

Once the message candidates are ranked, a diversifier service 412 may verify that the top message candidates are not types of message that has recently been sent to the respective user. For example, if the messages are from a same channel, same author, etc. If the top message candidates are repetitive in their content in comparison to the last few sent notifications, then the message candidates may be reranked. The diversifier service 412 balances high quality and low similarity using impression capping. There may also be product policies, such as certain items are featured by the moderators and are exceptions to the rules of ranking. Other soft constraints may re-rank the message candidates, such as multi-domain item blending.

Additional, sometimes it's not just a message that needs to be recommended because the message would not be self-contained and the context within a conversation is critical. Furthermore, popularity-based recommends often result in out-of-order messages in the channel. Therefore, messages may be first descrambled and bundled based on the author of the messages and the closeness in time of sending their messages. A message bundling service 409 may including loading message using a data store and creating bundles that are split by channels and then followed by a literal scan. Features are extracted for downstream decision and all bundles and bundle features are stored with those with more than one message. Then, to construct conversations, the explicit reply-to may be used to group bundles into conversations. The machine-learning model may be used to further infer the "reply-to" relationship between messages.

One or more top message candidates may be selected by a message selector service 414 and a send decider service 416 may send the top message candidates to the smart notification service 302 and sent via a simple channel 306. The smart notification service 302 is central and therefore, all potential notifications are routed through the smart notification service 302 so that it can make the final decision to send or not send.

Figure 5:
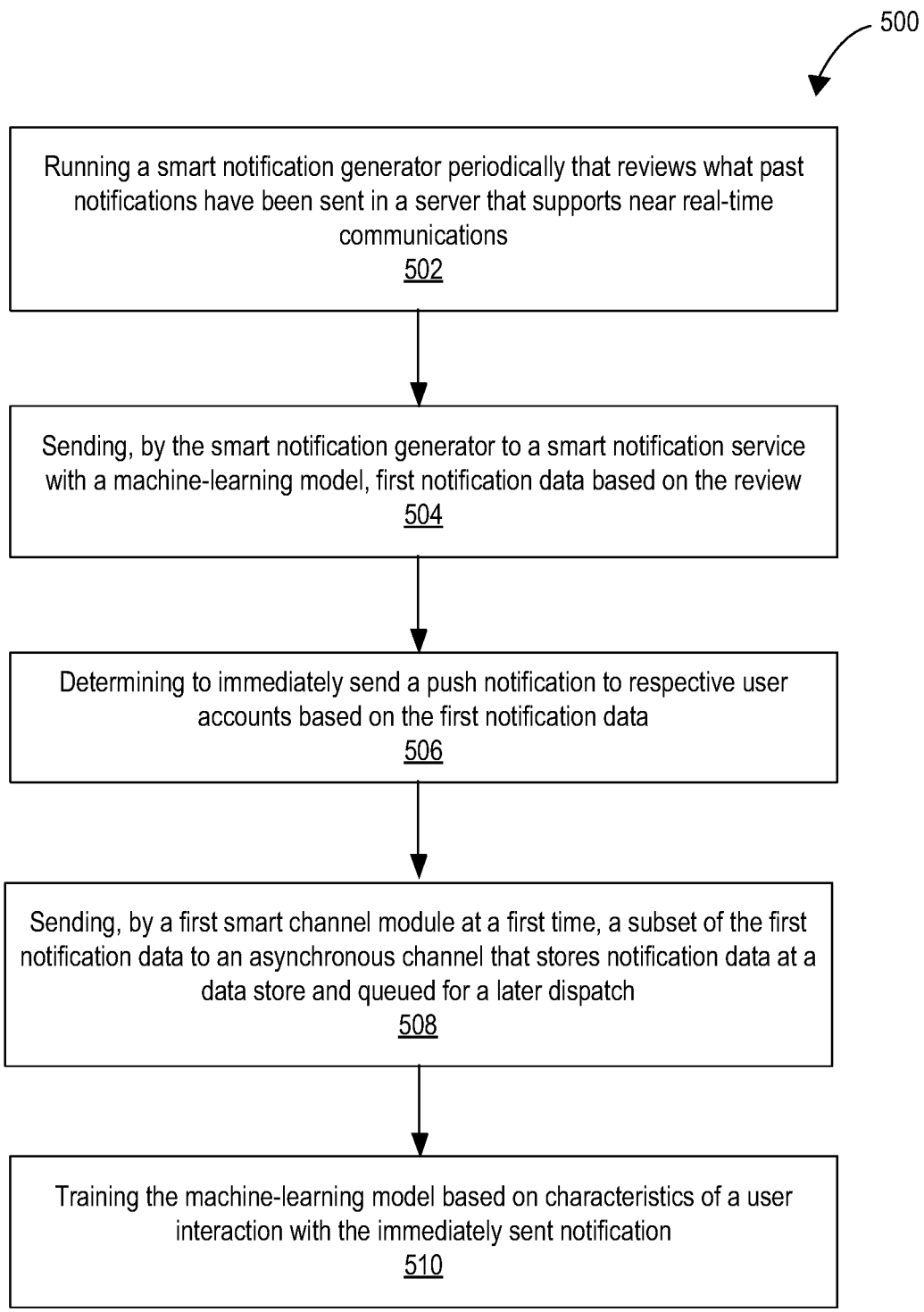
FIG. 5 illustrates an example flowchart for sending machine-learning-driven (ML-driven) notifications, according to some examples of the present disclosure in accordance with one embodiment.

FIG. 5 illustrates an example flowchart for sending ML-driven notifications, according to some examples of the present disclosure in accordance with one embodiment.

FIG. 5 illustrates an example method 500 for real-time message moderation, according to some examples of the present disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes running a smart notification generator periodically that reviews what past notifications have been sent in a server that supports near real-time communications at block 502. For example, the notification service 126, an example of which is illustrated in FIG. 1, runs the smart notification generator periodically.

In some cases, the method 500 includes reevaluating, by the smart notification generator, the stored notification data from the data store and consolidating a set of sent notifications into a summary notification based on the reevaluated data. The consolidating may be based on a common characteristic. Furthermore, the summary notification may include portions of at least some each of the sent notifications. For example, if each sent notification is associated with messages, the first couple of words or phrases may be sufficient to give a sense as to what the associated conversation or train of thought may be. In some cases, the method 500 includes replacing the sent notifications with the summary notification at a notification inbox.

In some cases, one or more other notification generator is integrated. For example, a second notification generator is integrated and evaluates potential notification data in comparison to stored historical notification data from the data store. The potential notification data may include events at a near real-time communication channel associated with the respective user account. The second notification generator may then send third notification data to the notification service based on the review.

According to some examples, the method 500 includes sending, by the smart notification generator to a smart notification service with a machine-learning model, first notification data based on the review at block 504. For example, the notification service 122, an example of which is illustrated in FIG. 1, sends the first notification data.

According to some examples, the method 500 includes determining to immediately send a push notification to respective user accounts based on the first notification data at block 506. For example, the notification service 122, an example of which is illustrated in FIG. 1, determines to immediately send the push notification.

According to some examples, the method 500 includes sending, by a first smart channel module at a first time, a subset of the first notification data to an asynchronous channel that stores notification data at a data store and queued for a later dispatch at block 508. For example, the notification service 122, an example of which is illustrated in FIG. 1, sends the subset of the first notification data.

In some cases, the method 500 includes reevaluating, by the first smart channel module at a second time after the first time, the stored notification data from the data store and dispatching a summary notification based on the queued notification data based on past patterns of sent notifications learned by the machine-learning model.

According to some examples, the method 500 includes training the machine-learning model based on characteristics of a user interaction with the immediately sent notification at block 510. For example, the notification service 122, an example of which is illustrated in FIG. 1, trains the machine-learning model. In some cases, the user interaction includes at least one of unsubscribing, responding to an in-app survey in a negative or positive manner, clicking on a notification, staying in-app for longer than a threshold of time, directly engaging with content sent in the notification, or not interacting.

Figure 6:
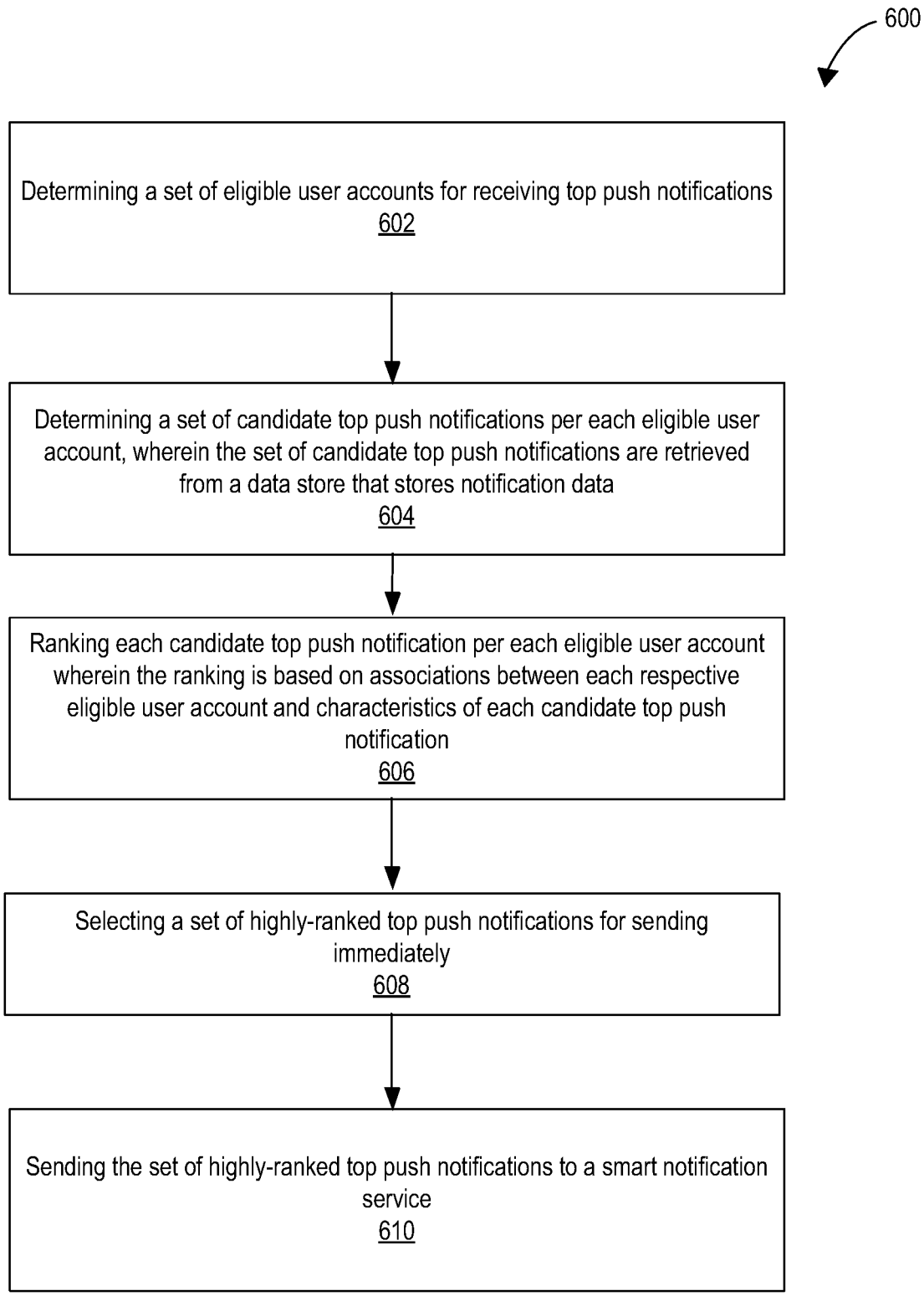
FIG. 6 illustrates an example flowchart for determining push notification candidates, according to some examples of the present disclosure in accordance with one embodiment.

According to some examples, the method 500 includes determining, at the smart notification service, to send a first notification to a simple channel that delivers the first notification to a separate service to a user based on the first notification data. In some cases, the first notification is sent via the simple channel in response to the first notification data including time-sensitive characteristics. According to some examples, the method 500 includes sending one or more push notifications, notifications in a notification inbox, in-application notification, and batched notifications in an email inbox through the smart notification service based on interactions learned by the machine-learning model FIG. 6 illustrates an example flowchart for determining push notification candidates, according to some examples of the present disclosure in accordance with one embodiment.

Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes determining a set of eligible user accounts for receiving push notifications at block 602. For example, the notification service 122, an example of which is illustrated in FIG. 1, determines the set of eligible user accounts. In some cases, at least one of the candidate push notifications being a direct message, including a mention of the respective user account, or has an author or associated with topics followed by the respective user accounts positively affects the ranking. In some cases, the candidate push notification is determined from receiving trending content from an indexed trending content database, finding optimal users for whom it is optimal to send a push notification presently, and pulling message candidates associated with the optimal users.

According to some examples, the method 600 includes determining a set of candidate push notifications per each eligible user account, wherein the set of candidate push notifications are retrieved from the data store at block 604. For example, the notification service 122, an example of which is illustrated in FIG. 1, determines the set of candidate push notifications.

According to some examples, the method 600 includes ranking each candidate push notification per each eligible user account at block 606. For example, the notification service 122, an example of which is illustrated in FIG. 1, ranks each candidate. In some cases, the ranking is based on associations between each respective eligible user account and characteristics of each candidate push notification. Furthermore, in some cases the method 600 includes re-ranking the candidate push notifications to de-rank the candidate push notifications that are similar to recently pushed notifications to respective user accounts.

According to some examples, the method 600 includes selecting a set of highly ranked push notifications for sending immediately at block 68. For example, the notification service 122, an example of which is illustrated in FIG. 1, selects the set of highly ranked push notifications. According to some examples, the method 600 includes sending the set of highly ranked push notifications as the first notification data to the smart notification service at block 610. For example, the notification service 122, an example of which is illustrated in FIG. 1, sends the set of highly ranked push notifications.

Figure 7:
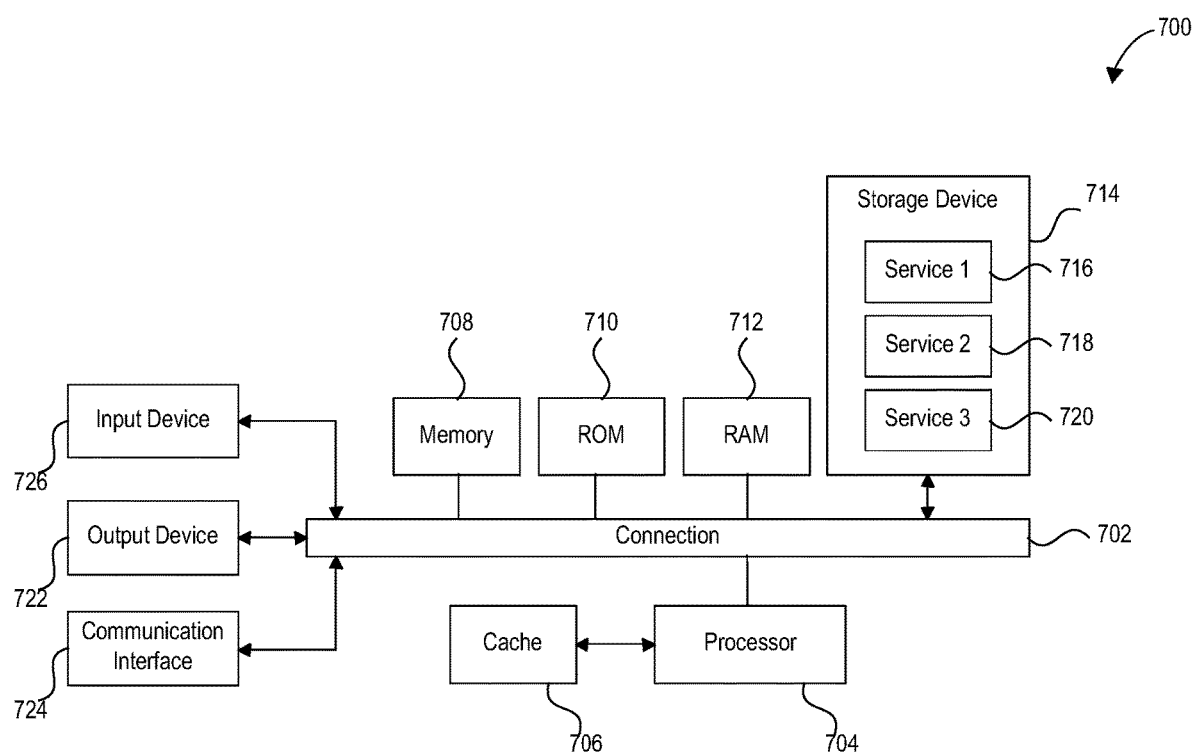
FIG. 7 shows an example of a system for implementing certain aspects of the present technology.

FIG. 7 shows an example of computing system 700, which can be for example any computing device making up client application 104, community hosting service 102, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., such that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method including:
    running a smart notification generator periodically that reviews what past notifications have been sent in a server that supports near real-time communications;
    sending, by the smart notification generator to a smart notification service with a machine-learning model, first notification data based on the review;
    determining to immediately send a push notification to respective user accounts based on the first notification data;
    sending, by a first smart channel module at a first time, a subset of the first notification data to an asynchronous channel that stores notification data at a data store and queued for a later dispatch; and
    training the machine-learning model based on characteristics of a user interaction with the immediately sent notification.

2. The computer-implemented method of claim 1, further comprising:
    reevaluating, by the smart notification generator, the stored notification data from the data store;
    consolidating a set of sent notifications into a summary notification based on the reevaluated data, wherein the consolidating is based on a common characteristic, wherein the summary notification includes portions of at least some of the sent notifications; and
    replacing the sent notifications with the summary notification at a notification inbox.

3. The computer-implemented method of claim 1, further comprising:
    reevaluating, by the first smart channel module at a second time after the first time, the stored notification data from the data store; and
    dispatching a summary notification based on the queued notification data based on past patterns of sent notifications learned by the machine-learning model.

4. The computer-implemented method of claim 1, further comprising:
    integrating a second notification generator;
    evaluating, by the second notification generator, potential notification data in comparison to stored historical notification data from the data store, wherein the potential notification data include events at a near real-time communication channel associated with the respective user account; and
    sending, by the second notification generator to the smart notification service, third notification data based on the review.

5. The computer-implemented method of claim 1, further comprising:
    determining, at the smart notification service, to send a first notification to a simple channel that delivers the first notification to a separate service to a user based on the first notification data.

6. The computer-implemented method of claim 1, wherein the user interaction includes at least one of unsubscribing, responding to an in-app survey in a negative or positive manner, clicking on a notification, staying in-app for longer than a threshold of time, directly engaging with content sent in the notification, or not interacting.

7. The computer-implemented method of claim 1, further comprising:
    determining a set of eligible user accounts for receiving push notifications;
    determining a set of candidate push notifications per each eligible user account, wherein the set of candidate push notifications are retrieved from the data store;
    ranking each candidate push notification per each eligible user account wherein the ranking is based on associations between each respective eligible user account and characteristics of each candidate push notification;
    selecting a set of highly ranked push notifications for sending immediately; and
    sending the set of highly ranked push notifications as the first notification data to the smart notification service.

8. The computer-implemented method of claim 7, wherein at least one of the candidate push notifications being a direct message, including a mention of the respective user account, or has an author or associated with topics followed by the respective user accounts positively affects the ranking.

9. The computer-implemented method of claim 7, wherein the determining the set of eligible user accounts considers when a last push notification was sent to the respective user account and a cadence associated with the respective user account.

10. The computer-implemented method of claim 7, further comprising:
    re-ranking the candidate push notifications to de-rank a subset of candidate push notifications that are similar to recently pushed notifications to respective user accounts.

11. A non-transitory computer-readable medium comprising instructions, the instructions, when executed by a computing system, causes the computing system to:
    run a smart notification generator periodically that reviews what past notifications have been sent in a server that supports near real-time communications;
    send, by the smart notification generator to a smart notification service with a machine-learning model, first notification data based on the review;
    determine to immediately send a push notification to respective user accounts based on the first notification data;
    send, by a first smart channel module at a first time, a subset of the first notification data to an asynchronous channel that stores notification data at a data store and queued for a later dispatch; and train the machine-learning model based on characteristics of a user interaction with the immediately sent notification.

12. The non-transitory computer-readable medium of claim 11, wherein the instructions, when executed by the computing system, causes the computing system to:
reevaluate, by the smart notification generator, the stored notification data from the data store;
consolidate a set of sent notifications into a summary notification based on the reevaluated data, wherein the consolidating is based on a common characteristic, wherein the summary notification includes portions of at least some of the sent notifications; and
replace the sent notifications with the summary notification at a notification inbox.

13. The non-transitory computer-readable medium of claim 11, wherein the instructions, when executed by the computing system, causes the computing system to:
reevaluate, by the first smart channel module at a second time after the first time, the stored notification data from the data store; and
dispatch a summary notification based on the queued notification data based on past patterns of sent notifications learned by the machine-learning model.

14. The non-transitory computer-readable medium of claim 11, wherein the instructions, when executed by the computing system, causes the computing system to:
integrate a second notification generator;
evaluate, by the second notification generator, potential notification data in comparison to stored historical notification data from the data store, wherein the potential notification data include events at a near real-time communication channel associated with the respective user account; and
send, by the second notification generator to the smart notification service, third notification data based on the review.

15. The non-transitory computer-readable medium of claim 11, wherein the instructions, when executed by the computing system, causes the computing system to:
determine, at the smart notification service, to send a first notification to a simple channel that delivers the first notification to a separate service to a user based on the first notification data.

16. The non-transitory computer-readable medium of claim 11, wherein the user interaction includes at least one of unsubscribing, responding to an in-app survey in a negative or positive manner, clicking on a notification, staying in-app for longer than a threshold of time, directly engaging with content sent in the notification, or not interacting.

17. The non-transitory computer-readable medium of claim 11, wherein the instructions, when executed by the computing system, causes the computing system to:
determine a set of eligible user accounts for receiving push notifications;
determine a set of candidate push notifications per each eligible user account, wherein the set of candidate push notifications are retrieved from the data store;
rank each candidate push notification per each eligible user account wherein the ranking is based on associations between each respective eligible user account and characteristics of each candidate push notification;
select a set of highly ranked push notifications for sending immediately; and
send the set of highly ranked push notifications as the first notification data to the smart notification service.

18. The non-transitory computer-readable medium of claim 17, wherein at least one of the candidate push notifications being a direct message, including a mention of the respective user account, or has an author or associated with topics followed by the respective user accounts positively affects the ranking.

19. The non-transitory computer-readable medium of claim 17, wherein the determining the set of eligible user accounts considers when a last push notification was sent to the respective user account and a cadence associated with the respective user account.

20. A system comprising:
one or more processors; and
a non-transitory computer-readable medium comprising instructions, the instructions, when executed by the one or more processors, causes the one or more processors to:
run a smart notification generator periodically that reviews what past notifications have been sent in a server that supports near real-time communications;
send, by the smart notification generator to a smart notification service with a machine-learning model, first notification data based on the review;
determine to immediately send a push notification to respective user accounts based on the first notification data;
send, by a first smart channel module at a first time, a subset of the first notification data to an asynchronous channel that stores notification data at a data store and queued for a later dispatch; and
train the machine-learning model based on characteristics of a user interaction with the immediately sent notification.

* * * * *